(12) United States Patent
Kim et al.

(10) Patent No.: US 10,242,639 B2
(45) Date of Patent: *Mar. 26, 2019

(54) HEAD-MOUNTED DISPLAY DEVICE AND METHOD OF CHANGING LIGHT TRANSMITTANCE OF THE SAME

(71) Applicant: Samsung Electronics Co., Ltd., Gyeonggi-do (KR)

(72) Inventors: Dae-Hyun Kim, Gyeonggi-do (KR); Lae-Kyoung Kim, Gyeonggi-do (KR); Soon-Seob Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/897,845

(22) Filed: Feb. 15, 2018

(65) Prior Publication Data
US 2018/0174547 A1    Jun. 21, 2018

Related U.S. Application Data

(63) Continuation of application No. 14/538,456, filed on Nov. 11, 2014, now Pat. No. 9,898,995.

(30) Foreign Application Priority Data

Nov. 18, 2013   (KR) .................. 10-2013-0140188

(51) Int. Cl.
| | | |
|---|---|---|
| *G09G 3/38* | (2006.01) | |
| *G02B 27/01* | (2006.01) | |
| *G02F 1/153* | (2006.01) | |

(52) U.S. Cl.
CPC ............. *G09G 3/38* (2013.01); *G02B 27/017* (2013.01); *G02B 27/0172* (2013.01);
(Continued)

(58) Field of Classification Search
CPC ............. H04N 13/0426; H04N 13/044; G02B 27/017; G09G 2320/0233;
(Continued)

(56) References Cited

U.S. PATENT DOCUMENTS

| | | |
|---|---|---|
| 5,361,359 A | 11/1994 | Tajalli |
| 9,898,995 B2 * | 2/2018 | Kim ..................... G09G 3/38 |

(Continued)

FOREIGN PATENT DOCUMENTS

| | | |
|---|---|---|
| CN | 103364953 | 10/2013 |
| JP | 2011-048375 | 3/2011 |

(Continued)

OTHER PUBLICATIONS

International Search Report dated Jan. 21, 2015 issued in counterpart application No. PCT/KR2014/009725.

(Continued)

*Primary Examiner* — Antonio A Caschera
(74) *Attorney, Agent, or Firm* — The Farrell Law Firm, P.C.

(57) ABSTRACT

A method of changing a light transmittance of a head-mounted display device including a display and an optical lens and a head-mounted display device. The method includes obtaining, by a sensor, a first illuminance around the head-mounted display device; determining a first light transmittance based on the first illuminance and a type of a content to display on the display; changing, by a processor, a light transmittance of the optical lens to the first light transmittance; and wherein when the first illuminance is greater than a second illuminance, the first light transmittance corresponding to the first illuminance is less than a second light transmittance corresponding to the second illuminance.

18 Claims, 11 Drawing Sheets

(52) U.S. Cl.
CPC ............... *G02B 2027/014* (2013.01); *G02B 2027/0118* (2013.01); *G02B 2027/0178* (2013.01); *G02F 1/153* (2013.01); *G09G 2300/023* (2013.01); *G09G 2320/062* (2013.01); *G09G 2320/0626* (2013.01); *G09G 2360/144* (2013.01)

(58) Field of Classification Search
CPC ... G09G 2320/0626; G09G 2320/0646; G09G 2360/14; G09G 2360/144; G09G 2360/16
See application file for complete search history.

(56) References Cited

U.S. PATENT DOCUMENTS

| | | |
|---|---|---|
| 2005/0207314 A1 | 9/2005 | Wada et al. |
| 2010/0188325 A1 | 7/2010 | Inoue |
| 2011/0254855 A1 | 10/2011 | Anders |
| 2012/0068913 A1 | 3/2012 | Bar-Zeev et al. |
| 2012/0069046 A1 | 3/2012 | Rapoport et al. |
| 2012/0218301 A1 | 8/2012 | Miller |
| 2013/0113973 A1 | 5/2013 | Miao |
| 2013/0135354 A1 | 5/2013 | Ookawara |
| 2013/0162505 A1 | 6/2013 | Crocco et al. |
| 2013/0257691 A1 | 10/2013 | Saito |
| 2015/0058877 A1 | 2/2015 | Lakkundi |

FOREIGN PATENT DOCUMENTS

| | | |
|---|---|---|
| JP | 2013-210643 | 10/2013 |
| KR | 2009-0066042 | 6/2009 |
| KR | 10-0919360 | 9/2009 |

OTHER PUBLICATIONS

European Search Report dated Jun. 9, 2017 issued in counterpart application No. 14862789.6-1562, 10 pages.

Chinese Office Action dated Oct. 11, 2017 issued in counterpart application No. 201480070168.8, 18 pages.

"Task Manager" Computer Hope (http://www.computerhope.com/jargon/t/taskmana.htm). Oct. 9, 2003. Accessed via web on Nov. 28, 2016 https://webarchive.org/web/20031009044227/http://www.computerhope.com/jargon/t/taskmana.htm.

* cited by examiner

HEAD-MOUNTED DISPLAY DEVICE AND METHOD OF CHANGING LIGHT TRANSMITTANCE OF THE SAME

PRIORITY

This continuation application application claims priority under 35 U.S.C. § 120 to a U.S. patent application filed on Nov. 11, 2014 in the United States Patent and Trademark Office and assigned Ser. No. 14/538,456, which claims priority under 35 U.S.C. § 119(a) to a Korean Patent Application filed on Nov. 18, 2013 in the Korean Intellectual Property Office and assigned Serial No. 10-2013-0140188, the entire contents of each of which are incorporated herein by reference.

BACKGROUND

1. Field of the Invention

The present invention relates generally to a head-mounted display device and a method of changing a light transmittance of the head-mounted display device, and more particularly, to a head-mounted display device that changes a light transmittance light of a transmission unit using a light transmittance determined to correspond to an illuminance and an application, and a method of changing the light transmittance of the head-mounted display device.

2. Description of the Related Art

Recently, various services and functions provided by portable devices have been gradually expanded. In addition, various applications capable of being executed in portable devices have also been developed.

In order to enhance the utility of such portable devices and satisfy users' various desires, various portable devices, such as wrist-mounted portable devices and head-mounted portable devices, have been developed.

Light incident on a head-mounted portable device is not 100% transmitted and, thus, may look darker than the light actually is. In addition, when the intensity of incident light is strong, the head-mounted portable device may consume more battery power and may generate heat in order to display a text, an image or a video displayed on a display unit more brightly to correspond to the incident light.

SUMMARY

The present invention has been made to address the above-mentioned problems and disadvantages, and to provide at least the advantages described below. Accordingly, an aspect of the present invention, there is provided a method of changing a light transmittance of a head-mounted display device and the head-mounted display device to provide the user with improved visibility of a content displayed.

In accordance with an aspect of the present invention, there is provided a method of changing a light transmittance of a head-mounted display device including a display and an optical lens and a head-mounted display device. The method includes obtaining, by a sensor, a first illuminance around the head-mounted display device; determining a first light transmittance based on the first illuminance and a type of a content to display on the display; changing, by a processor, a light transmittance of the optical lens to the first light transmittance; and wherein when the first illuminance is greater than a second illuminance, the first light transmittance corresponding to the first illuminance is less than a second light transmittance corresponding to the second illuminance.

In accordance with another aspect of the present invention, there is provided a head-mounted display device. The head-mounted display device includes a sensor; a display; a light transmission unit configured to adjust a light transmittance of an optical lens included in the head-mounted display device; and a controller configured to obtain, using the sensor, a first illuminance around the head-mounted display device, determine a first transmittance based on the first illuminance and a type of the content to display on the display, and change the light transmittance of the optical lens to the first light transmittance, wherein when the first illuminance is greater than a second illuminance, the first light transmittance corresponding to the first illuminance is less than a second light transmittance corresponding to the second illuminance.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Figure 1A:
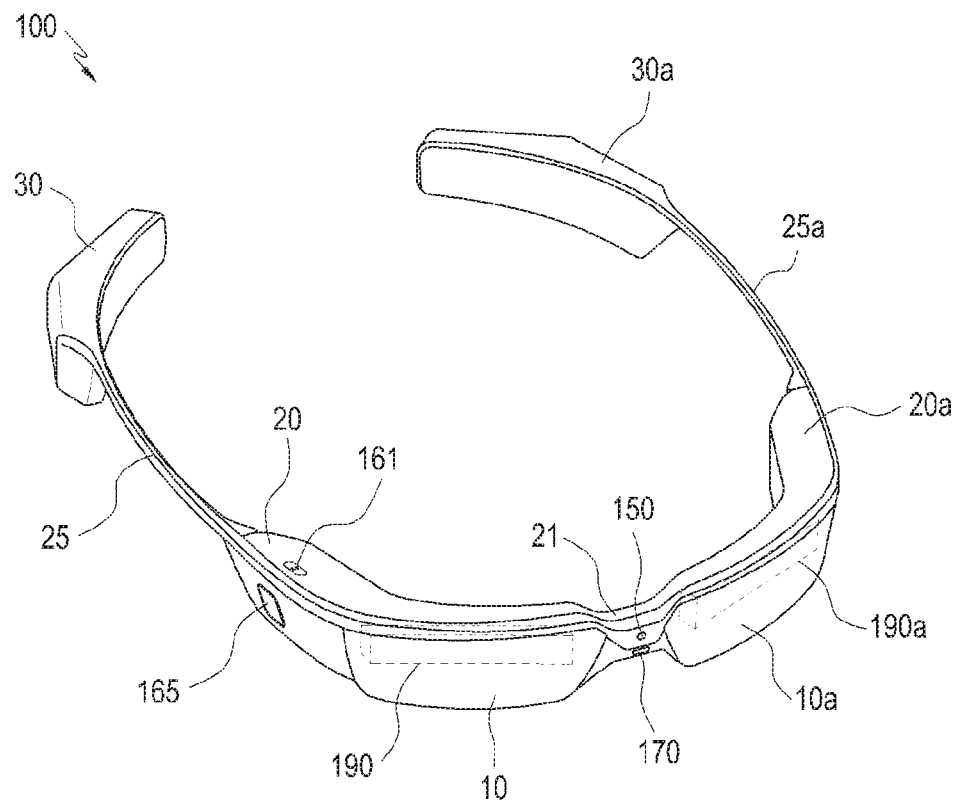
FIG. 1A is a perspective view illustrating a head-mounted display device according to an embodiment of the present invention.

Hereinafter, embodiments of the present invention are described in detail with reference to the accompanying drawings. Further, the methods of manufacturing and using the present invention are described in detail with reference to the accompanying drawings. The same reference numerals or the signs represented in each of the drawings indicate the elements or the components that perform substantially the same functions.

Although terms including an ordinal number such as first, second, etc. may be used for describing various elements, the structural elements are not restricted by the terms. The terms are only used to distinguish one element from another element. For example, without departing from the scope of the present invention, a first structural element may be referred to as a second structural element. Similarly, the second structural element may also be referred to as the first structural element. As used herein, the term "and/or" includes any and all combinations of one or more associated items.

In the present invention, the terms are used to describe an embodiment, and are not intended to limit and/or restrict the present invention. As used herein, the singular forms are intended to include the plural forms as well, unless the context clearly indicates otherwise. In the present invention, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof. The same reference numerals represented in each of the drawings indicate the elements that perform substantially the same functions.

FIG. 1A is a perspective view illustrating a head-mounted display device according to an embodiment of the present invention.

Referring to FIG. 1A, a head-mounted display device 100 refers to a display device which is wearable on a user's head. A see-through display unit is positioned in a region adjacent to the user's head (e.g., eyes), and a speaker (not illustrated) is positioned in a region adjacent to the user's ears so that visual information and auditory information can be provided to the user. The head-mounted display device 100 includes an eyeglass type display device or a helmet type display device.

The head-mounted display device 100 includes a monocular-type display device having a single display unit 190 that displays contents or a binocular-type display device having a plurality of display units 190 and 190a that may display a three-dimensional image. The binocular-type display device may selectively operate one of the plurality of display units 190 and 190a.

The head-mounted display device 100 includes a first optical lens 10, a first housing 20 that accommodates a part of the first optical lens 10, a second housing 30 that includes a battery, a first housing connection portion 25 that connects the first housing 20 and the second housing 30. In addition, the head-mounted display device 100 includes a second optical lens 10a, a third housing 20a that accommodates a part of the second optical lens 10a, a fourth housing 30a that includes a battery, and a second housing connection portion 25a that connects the third housing 20a and the fourth housing 30a. The battery may be positioned in the first housing 20, the second housing 30, the third housing 20a, or the fourth housing 30a.

The head-mounted display device 100 is mounted on the user's head by the elastically flexible first housing connection portion 25 and the second housing connection portion 25a.

The head-mounted display device 100 includes a bridge 21 that connects the first housing 20 and the third housing 20a.

The head-mounted display device 100 includes a light transmission unit 195 (see FIG. 1B) if a single display unit 190 is included, or a plurality of light transmission units 195 if a plurality of display units 190 and 190a are included. The light transmission unit 195 is coupled to the rear surface of the second optical lens 10a using an optically clear adhesive. The light transmission unit 195 may be coupled to the rear surface of the first optical lens 10 using an optically clear adhesive. In addition, the light transmission unit 195 is coupled to the front surface of the first optical lens 10 and the second optical lens 10a, respectively, using an optically clear adhesive.

The display unit 190 or 190a is positioned at a distance (e.g., not more than 5 cm) from at least one of the front surface of the first optical lens 10 or the second optical lens 10a, respectively, or positioned at a distance (e.g. not more than 5 cm) from the rear surface of the first optical lens 10 or the second optical lens 10a, respectively. A person having an ordinary skill in the art may easily understand that the spacing between the display units 190 or 190a and the first optical lens 10 or the second optical lens 10a, respectively, may be changed to correspond to a performance or a structure of the head-mounted display device 100.

Figure 2:
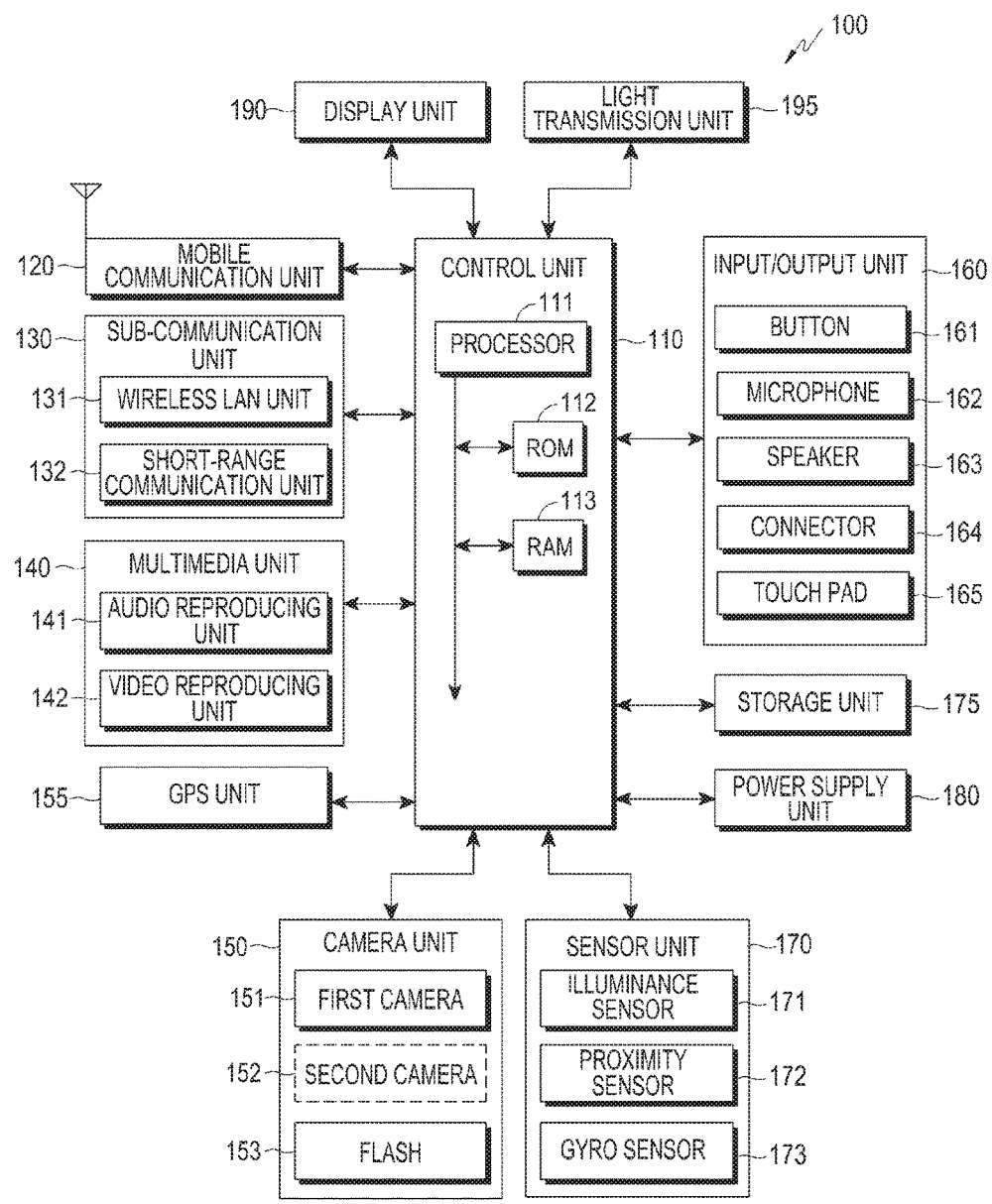
FIG. 2 is a schematic block diagram illustrating a head-mounted display device according to an embodiment of the present invention.

The head-mounted display device 100 includes a camera unit 150 (see FIG. 2, where the camera unit 150 may include a first camera 151, a second camera 152, and a third camera not shown) and a sensor unit 170 (see FIG. 2, where the sensor unit includes a plurality of sensors). The camera unit 150 is positioned in at least one of the first housing 20 and the third housing 20a. For example, the camera unit 150 may be positioned in one of the first housing 20 and the third housing 20a or the first camera 151 of the camera unit 150 may be positioned in the first housing 20 and the second camera 152 of the camera unit 150 may be positioned in the third housing 20a. Further, the third camera of the camera unit 150 may be positioned in the bridge 21.

The sensor unit 170 is positioned in at least one of the first housing 20 and the third housing 20a. For example, the sensor unit 170 may be positioned in one of the first housing 20 and the third housing 20a or the sensors of the sensor unit may be positioned in each of the first housing 20 and the third housing 20a. Further, a sensor of the sensor unit 170 may be positioned in the bridge 21.

The first housing 20 of the head-mounted display device 100 includes at least one of a button 161 (see FIG. 2), a microphone 162 (see FIG. 2), a speaker 163 (see FIG. 2), a connector 164, and a touch pad 165 (see FIG. 2). The term "housing" in the present invention includes the first housing 20, the second housing 30, the third housing 20a, or the fourth housing 30a.

It may be easily understood by a person ordinarily skilled in the art that the positions of the constituent elements of the head-mounted display device 100 illustrated in FIG. 1A may be changed to correspond to the performance or structure of the head-mounted display device 100.

Figure 1B:
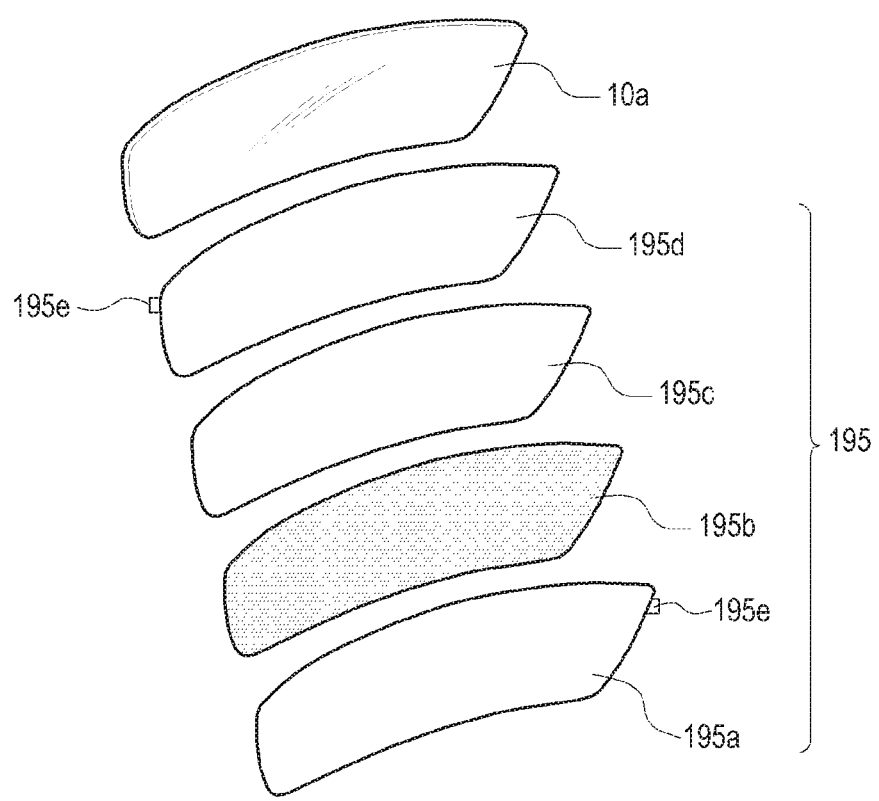
FIG. 1B is an exploded view of a light transmission unit of a head-mounted display device according to an embodiment of the present invention.

FIG. 1B is a perspective view of a light transmission unit 195 of the head-mounted display device 100 according to an embodiment of the present invention.

Referring to FIG. 1B, a light transmission unit 195 is coupled to the rear surface of the second optical lens 10a. Alternatively, a light transmission unit 195 may be coupled to the front surface of the second optical lens 10a.

The light transmission unit 195 includes a first indium tin oxide layer 195a, an electrochromic layer 195b, an electrolyte layer 195c, a second indium tin oxide layer 195d, and electrodes 195e. Hereinafter, each indium tin oxide layer will be referred to as an Indium Tin Oxide (ITO) layer. The term, "ITO layer" may include an ITO film or an ITO glass. In addition, an ITO layer may be implemented using a silver nano wire, a copper mesh, a silver mesh, a silver salt, or silver nanoparticles which may replace the ITO.

The light transmission unit 195 includes a first ITO layer 195a, an electrochromic layer 195b positioned on the ITO layer 195a and having a light transmittance which is changed to correspond to a supply voltage, an electrolyte layer 195c positioned on the electrochromic layer 195b, a second ITO layer 195d positioned on the electrolyte layer 195c, and electrodes 195e which are connected with the first ITO layer 195a and the second ITO layer 195d, respectively, and receives an input of the supply voltage.

Each of the electrodes 195e is implemented as a transparent electrode. It may be easily understood by a person ordinarily skilled in the art that the position of each electrode 195e (e.g., a right upper end of the first ITO layer 195a or a left upper end of the second ITO layer 195d) may be changed to correspond to the performance or structure of the head-mounted display device 100.

FIG. 2 is a schematic block diagram illustrating a head-mounted display device 100 according to an embodiment of the present invention.

Referring to FIG. 2, a head-mounted display device 100 is connected with an external device (not illustrated) wiredly or wirelessly using a mobile communication unit 120, a sub-communication unit 130, and a connector 164. The external device may include a portable phone (not illustrated) which includes a screen having an area wider than that of each of the plurality of display units 190 or 190a, a smart phone (not illustrated), a tablet Personal Computer (PC) (not illustrated), a Motion Picture Experts Group Audio Layer 3 (MP3) player, a video image player, a 3 Dimensional Television (3D-TV), a smart TV, an Light Emitting Diode (LED) TV, an Liquid Crystal Display (LCD) TV, or a server (not illustrated). In addition, the external device may include another head-mounted display device (not illustrated).

The head-mounted display device 100 includes a device capable of transmitting/receiving data (e.g., an image, a text, a voice, or a video) with another connectable external device using a user input (or a user interaction, for example, a voice, a motion, a touch or a touch gesture) which is input via a head-mounted display device 100.

The head-mounted display device 100 includes a display unit 190 and a light transmission unit 195. The head-mounted display device 100 includes a control unit 110, a mobile communication unit 120, a sub-communication unit 130, a multimedia unit 140, a camera unit 150, a Global Positioning System (GPS) unit 155, an input/output unit 160, a sensor unit 170, a storage unit 175, and a power supply unit 180.

The sub-communication unit 130 includes at least one of a wireless Local Area Network (LAN) unit 131 and a short-range communication unit 132, and the multimedia unit 140 includes at least one of an audio reproducing unit 141 and a video reproducing unit 142. The camera unit 150 includes at least one of a first camera 151 and a second camera 152, the input/output unit 160 includes at least one of a button 161, a microphone 162, a speaker 163, a connector 164, and a touch pad 165. The sensor unit 170 includes an illuminance sensor 171, a proximity sensor 172, and a gyro sensor 173.

The control unit 110 includes a processor 111, a Read-Only Memory (ROM) 112 in which a control program for controlling the head-mounted display device 100 is stored, and an Random Access Memory (RAM) 113 which may be used as a region to store a signal or data input received by the head-mounted display device 100 or a storage region for various tasks performed by the head-mounted display device 100.

The control unit 110 controls overall action of the head-mounted display device 100 and signal flow between the elements 120 to 195 of the head-mounted display device 100, and processing data. The control unit 110 controls a power supply, from the power supply unit 180, to the elements 120 to 195. In addition, when a user input or a set condition that is stored is satisfied, the control unit 110 executes an Operating System (OS) and various applications stored in the storage unit 175.

The processor 111 includes a Graphics Processing Unit (GPU) (not illustrated) for graphic processing. The processor 111 may be implemented as a core (not illustrated) and the GPU (not illustrated) may be implemented as a System on Chip (SoC). The processor 111 may include a single core, dual cores, triple cores, quad cores, and cores of multiples thereof. In addition, the processor 111, the ROM 112, and the RAM 113 are interconnected via an internal bus.

The control unit 110 controls the mobile communication unit 120, the sub-communication unit 130, the multimedia unit 140, the camera unit 150, the GPS unit 155, the input/output unit 160, the sensor unit 170, the storage unit 175, the power supply unit 180, the display unit 190, and the light transmission unit 195.

In the present invention, the term "control unit" includes the processor 111, the ROM 112, and the RAM 113.

The control unit 110 of an embodiment of the present invention detects an illuminance to determine an application to be displayed on the display unit 190 of the head-mounted display device 100, to determine a light transmittance corresponding with the illuminance and the application, and to change the light transmittance of the light transmission unit 195 of the head-mounted display device 100 to the determined light transmittance.

The control unit 110 determines a supply voltage corresponding to the determined light transmittance, and supplies the determined supply voltage to the light transmission unit 195.

The control unit 110 uses at least one of the illuminance detected via the sensor unit 170 and an illuminance received externally as the illuminance.

The control unit 110 determines an application using at least one of information of the application and contents executed by the application.

The control unit 110 uses at least one of a program manager that manages a life cycle of an application executed in the head-mounted display device 100 and an application specification file in which the application information is described in determining the application.

The control unit 110 determines an application using an activity manager or a package manager as the program manager.

The control unit 110 causes the determined light transmittance to be changed by a user input.

The control unit 110 causes the visibility of the contents displayed on the display unit 190 to be changed by the light transmittance of the light transmission unit 195.

The control unit 110 causes the determined light transmittance to be changed in a range from 5% to 95%.

The control unit 110 provides at least one of a visual feedback and an auditory feedback in response to a change of the light transmittance.

The control unit 110 detects the illuminance to determine the contents to be displayed on the display unit 190 of the head-mounted display device 100, and to change the light transmittance of the light transmission unit 195 of the head-mounted display device 100 according to the light transmittance determined according to the illuminance and the contents.

The control unit 110 determines an application to be displayed on the display unit 190 of the head-mounted display device 100, and changes the light transmittance of the light transmission unit 195 of the head-mounted display device 100 according to the determined light transmittance to correspond to the application.

The mobile communication unit 120 is connected with an external device wiredly or wirelessly using one or more antennas according to the control unit 110. The mobile communication unit 120 transmits/receives wireless signals for voice communication, video communication, Short Message Service (SMS), Multimedia Message Service (MMS), or data communication with a portable phone having a phone number connectable with the head-mounted display device 100, a smart phone (not illustrated), a tablet PC or another head-mounted display device (not illustrated).

The sub-communication unit 130 includes at least one of the wireless LAN unit 131, and the short-range communication unit 132. For example, the sub-communication unit 130 may include only one of the wireless LAN unit 131 and the short-range communication unit 132 or both the wireless LAN unit 131 and the short-range communication unit 132.

The wireless LAN unit 131 may be wirelessly connected to an Access Point (AP) in a place where the AP (not illustrated) is installed according to the control unit 110. The wireless LAN unit 131 supports the Wireless LAN Standards (IEEE802.11x) of the Institute of Electrical and Electronics Engineers (IEEE).

The short-range communication unit 132 provides short-range communication between the head-mounted display device 100 and an external device wirelessly without the AP according to the control unit 110. The short-range communication unit 132 may include, for example, Bluetooth, Bluetooth Low Energy, Infra-red Data Association (IrDA), Wireless Fidelity (Wi-Fi), Ultra Wideband (UWB), and Near Field Communication (NFC).

The head-mounted display device 100 includes, depending on its performance, at least one of the mobile communication unit 120, the wireless LAN unit 131, and the short-range communication unit 132. For example, depending on performance, the head-mounted display device 100 includes one of the mobile communication unit 120, the wireless LAN unit 131, short-range communication unit 132, and a combination of the mobile communication unit 120, the wireless LAN unit 131, and the short-range communication unit 132.

In the present invention, the term "communication unit" includes the mobile communication unit 120 and the sub-communication unit 130.

The mobile communication unit 120 of an embodiment of the present invention connects the head-mounted display device 100 and an external device according to the control unit 110. The mobile communication unit 120 transmits data or contents to an external device according to the control unit 110. In addition, the mobile communication unit 120 transmits/receives data to/from an external device according to the control unit 110. In addition, the mobile communication unit 120 receives an illumination reception from an external device according to the control unit 110.

The multimedia unit 140 includes the audio reproducing unit 141 or the video reproducing unit 142.

The audio reproducing unit 141 reproduces an audio source previously stored in the storage unit 175 of the head-mounted display device 100 or received from an external source (for example, an audio file, of which the file extension is mp3, Windows Media Audio (wma), Operation Good Guys (ogg), or Waveform Audio File (way)) using an audio compression/decompression (codec) unit according to the control unit 110.

The audio reproducing unit 141, according to an embodiment of the present invention, reproduces an auditory feedback corresponding to a change of the light transmittance of the light transmission unit 195 (e.g., output of the audio source stored in the storage unit 175) using the audio codec unit according to the control unit 110.

The video reproducing unit 142 reproduces a digital video source previously stored in the storage unit 175 of the head-mounted display device 100 or received from an external source (for example, a file, of which the file extension is Moving Picture Expert Group (mpeg or mpg), MPEG Audio Layer 4 (mp4), Audio Video Interleave (avi), Quick Time Movie (mov), Small Web Format (swf), Macromedia Flash (fla), or Matroska Video Format (mkv)) using a video codec unit according to the control unit 110. Almost all of the reproducing applications, which are capable of being executed in the head-mounted display device 100, reproduce an audio source or video file using the audio codec unit or the video codec unit. In addition, almost all of the reproducing applications, which are capable of being executed in the head-mounted display device 100, reproduce an audio source or still image file.

The video reproducing unit 142, according to an embodiment of the present invention, reproduces a visual feedback corresponding to a change of the light transmittance of the light transmission unit 195 (for example, output of a video source stored in the storage unit 175) using the video codec unit according to the control unit 110.

It may be easily understood by a person ordinarily skilled in the art that various types of video and audio codec units are manufactured and sold.

The audio reproducing unit 141 or the video reproducing unit 142 of the multimedia unit 140 may be included in the control unit 110. The term "video codec unit" in an embodiment of the present invention may include one or more video codec units. In addition, the term "audio codec unit" in an embodiment of the present invention includes one or more audio codec units.

The camera unit 150 photographs a still image or a moving image in a user's line of sight according to the control unit 110. The camera unit 150 may be positioned in at least one of the bridge 21, the first housing 20, and the third housing 20a. For example, the camera unit 150 may be positioned in one of the bridge 21, the first housing 20, and the third housing 20a; or the camera unit 150 may be positioned in two or more of the bridge 21, the first housing 20, and the third housing 20a. When including one camera, the head-mounted display device 100 includes the first camera 151. When including two or more cameras, the head-mounted display device 100 includes the first camera 151 and the second camera 152.

The head-mounted display device 100 may include a third camera (not illustrated) which may be positioned in one of the second housing 30 and the fourth housing 30a of the head-mounted display device 100 and is capable of photographing a still image or a moving image behind the user. In addition, the first camera 151 or the second camera 152 may include an auxiliary light source that provides an amount of light required for photographing (for example, a flash 153).

When the first camera 151 and the second camera 152 are positioned adjacent to each other (for example, the distance between the first camera 151 and the second camera 152 is larger than 2 cm and smaller than 8 cm), the first camera 151 and the second camera 152 may photograph a three-dimensional still image or a three-dimensional moving image according to the control unit 110. In addition, one of the first camera 151 and the second camera 152 may take a photograph including wide angle photography, telephotography, and close-up photography using a separate adaptor (not illustrated).

The camera unit 150, according to an embodiment of the present invention, may photograph a still image or a moving image around the head-mounted display device 100 and transmit the still image or the moving image to the control unit 110. The control unit 110 transmits the received still image or moving image to an external device using the mobile communication unit 120. In addition, the control unit 110 calculates the illumination around the head-mounted display device 100 using the photographed still image or moving image.

The GPS unit 155 periodically receives information (for example, correct position information or time information from a GPS satellite from which the head-mounted display device 100 is capable of receiving a signal) from a plurality of GPS satellites orbiting the earth. The head-mounted display device 100 determines the present position, moving speed, or time of the head-mounted display device 100 using the information received from the plurality of GPS satellites.

The input/output unit 160 includes one or more buttons 161, one or more microphones 162, one or more speakers 163, one or more connectors 164, or one or more touch pads 165.

Referring to FIGS. 1 and 2, the button 161 includes a power/lock button positioned on the first housing 20. The button 161 may include a home button on the first housing 20. In addition, the button 161 may be implemented not only as a physical button but also as a touch button on the housings of the head-mounted display device 100.

The microphone 162 receives a voice or a sound external to the head-mounted display device 100 and generates an electrical signal according to the control unit 110. The electrical signal generated by the microphone 162 is converted in the audio codec unit and stored in the storage unit 175 or output via the speaker 163. One or more microphones 162 may be positioned in the first housing 20 and the third housing 20a of the head-mounted display device 100. In addition, one or more microphones 162 may be positioned in the second housing 30 and the fourth housing 30a of the head-mounted display device 100.

The speaker 163 outputs sounds corresponding to various contents of the mobile communication unit 120, the sub-communication unit 130, the multimedia unit 140, the camera unit 150, or an application (for example, a wireless signal, a broadcast signal, an audio source, a video file, or a photograph) externally from the head-mounted display device 100, using the audio codec unit, according to the control unit 110. The speaker 163 outputs a sound corresponding to a function performed by the head-mounted display device 100 (for example, a touch operation sound corresponding to inputting a phone number, or taking a photograph).

At least one speaker 163 may be positioned in the housing of the head-mounted display device 100. Referring to FIGS. 1 and 2, the speaker 163 may be positioned in a region of the housing of the head-mounted display device 100 (for example, a region adjacent to a user's ear capable of receiving an output sound). In addition, the speaker 163 of the head-mounted display device 100 may include an air conduction speaker or a bone conduction speaker.

The speaker 163, according to an embodiment of the present invention, outputs an auditory feedback corresponding to a change of the light transmittance of the light transmission unit 195 according to the control unit 110.

The connector 164 connects the head-mounted display device 100 to an external device or a power source. The head-mounted display device 100 transmits data stored in the storage unit 175 to an external device or receives data from the external device via a wired cable connected to the connector 164 according to the control unit 110. The head-mounted display device 100 receives power from a power source connected to the connector 164 via the wired cable, or a charge for a battery.

The touch pad 165 receives a user input (for example, a touch or a touch and drag) to control the head-mounted display device 100. The touch pad 165 is planar (for example, a polygonal shape, a circular shape, an oval shape, or a rounded-rectangular shape) and incorporates a sensor. The touch pad 165 is positioned on a side surface of a housing of the head-mounted display device 100.

The user input of the touch pad 165 is not limited to contact by the user's body or a touchable input unit (for example, a stylus pen) but includes non-contact (for example, hovering in which a detectable spacing between the touch pad 165 and the user's body or between the touch pad 165 and an input unit is 20 mm or less). It may be easily understood by a person ordinarily skilled in the art that the detectable non-contact spacing in the touch pad 165 may be changed depending on the performance or structure of the head-mounted display device 100.

The head-mounted display device 100 may include one of a trackball and a pointing stick which is compatible with the touch pad 165.

The sensor unit 170 includes at least one sensor which detects a condition of the head-mounted display device 100 or a peripheral condition. For example, the sensor unit 170 is positioned on the front surface or a side surface of a housing of the head-mounted display device 100. The sensor unit 170 may include an illuminance sensor 171 which detects an amount of light around the head-mounted display device 100, a proximity sensor 172 which detects proximity of any other object in relation to the head-mounted display device 100, a gyro sensor 173 which detects a slope of the head-mounted display device 100 using rotational inertia of the head-mounted display device 100, an acceleration sensor which detects a moving condition of three axes (for example, x-axis, y-axis, and z-axis) applied to the head-mounted display device 100, a gravity sensor which detects an acting direction of gravity, or an altimeter which detects an altitude by measuring an atmospheric pressure.

The illuminance sensor 171, according to an embodiment of the present invention, detects an illuminance around the head-mounted display device 100. The illuminance sensor 171 transmits an illuminance signal corresponding to the detected illuminance to the control unit 110 according to the control unit 110.

The plurality of sensors included in the sensor unit 170 may be implemented with separate Integrated Circuits (ICs or chips) or a single chip (for example, a six-axis sensor including a geomagnetic sensor and an acceleration sensor or a nine-axis sensor including a geomagnetic sensor, an accelerator sensor and a gyro sensor).

It may be easily understood by a person ordinarily skilled in the art that the sensors of the sensor unit 170 may be added or omitted depending on the performance of the head-mounted display device 100.

The storage unit 175 stores signals or data to be input/output in response to an operation of the mobile communication unit 120, the sub-communication unit 130, the multimedia unit 140, the camera unit 150, the GPS unit 155, the input/output unit 160, the sensor unit 170, the display unit 190, or the light transmission unit 195 according to the control unit 110. The storage unit 175 stores control programs for controlling the head-mounted display device 100 or the control unit 110, a Graphical User Interface (GUI) related to an application provided by a manufacture or downloaded from an external source, images for providing the GUI, user information, a document, data bases, or associated data.

The term, "storage unit" in the present invention includes the storage unit 175, a ROM 112 or a RAM 114 within the control unit, or a memory card which may be equipped in the head-mounted display device 100 (for example, a micro Secure Digital (SD) card, and a memory stick). The storage unit 175 may include a non-volatile memory, a volatile memory, a Hard Disc Drive (HDD), or a Solid State Drive (SSD).

The storage unit 175, according to an embodiment of the present invention, may store a command, a command list, notification, texts (for example, Yes and No), an icon, an object, an application screen, contents displayed on the application screen, screen data, or various sub-screens which are displayed on the display unit 190.

The storage unit 175 may store illuminance information (for example, an identification ID for history management, an illuminance value, illuminance detecting time (for example, detecting time of the illuminance sensor 171 or receiving time for the communication unit)), or current position information (for example, an outdoor position by the GPS unit 155 or an indoor position by the mobile communication unit 120) which are received via the illuminance sensor 171 or the mobile communication unit 120. In addition, the storage unit 175 may include first illumination information or second illuminance information.

The storage unit 175 may store an application specification file (for example, when the OS is Android, the application specification file is a manifest file application (AndroidManifest.xml)) including various information items related to names and configurations of applications. In addition, the storage unit may store a program manager (for example, an activity manager or a package manager).

The storage unit 175 may store a light transmittance table. For example, the storage unit 175 may store a light transmittance table of an illuminance-application such as Table 1. The light transmittance table may be stored as a look-up table. The storage unit 175 may store an illuminance-light transmittance table (not illustrated). Further, the storage unit 175 may store an application-light transmittance table (not illustrated).

Light transmittance information corresponding to a determined light transmittance may be stored in the storage unit 175. The light transmittance information may include an identification ID for history management, a determined light transmittance, an illuminance corresponding to the light transmittance, a determined application, a content (or a content category) executed in the application, or the like. In addition, the storage unit may store first light transmittance information, second light transmittance information, or third light transmittance information.

The storage unit 175 may store a supply power table. For example, the storage unit may store a light transmittance-supply power table such as Table 2. The supply power table may be stored as a look-up table. The storage unit 175 may store supply voltage information corresponding to a determined supply voltage. The supply voltage information may include an identification ID for history management, a determined supply voltage, a light transmittance corresponding to the supply voltage, illuminance, a determined application, a content (or a content category) executed in the application, or the like.

The storage unit 175 may store a user input (for example, the user's voice, which is received through, for example, the microphone 162, the user's motion, which may be detected through, for example, the sensor 170, the user's touch, which is received through, for example, the button 161, or the user's touch gesture, which may be detected via the touch pad 165, for example, a touch, a flick or a swipe).

The storage unit 175 may store a visual feedback (for example, a video source) or an auditory feedback output from the speaker 163 to be recognized by the user, in response to a change of the light transmittance of the light transmission unit.

The power supply unit 180 supplies power to one or more batteries positioned within the head-mounted display device 100. The one or more batteries may be positioned in the second housing 30 and the fourth housing 30a. Further, the power supply unit 180 may supply power input from an external power source via a wired cable connected to the connector 164 to the head-mounted display device 100 according to the control unit 110. In addition, the power supply unit 180 may supply power to the head-mounted display device 100 via a wireless charge method (for example, a magnetic resonance method, an electromagnetic wave method, or a magnetic induction method) according to the control unit 110.

The display unit 190 may be a see-through display unit which may provide Graphical User Interfaces (GUIs) corresponding to various services (for example, video call, data transmission, still image photography, video image photography, or an executed application screen) to the user. The display unit 190 may supply a GUI corresponding to a user input which is input via the button 161, the microphone 162, the touch pad 165, or the sensor unit 170 to the user.

The display unit 190 may include a micro-display and an optical system. The display unit 190 may project an image displayed on the micro-display (for example, an LCD or an Organic LED (OLED)) to the user's eyes via the optical system (for example, a free curved optical system), including a lens and a wave-guide.

The micro-display may include a display panel of, for example, a Liquid Crystal Display (LCD) type, an Organic Light Emitted Diode (OLED), or an Active Matrix Organic Light Emitted Diode (AMOLED).

A monocular-type display device includes a single display unit 190 that displays contents. A binocular-type display device includes a plurality of display units 190 and 190a that may display a three-dimensional image.

The light transmission unit 195 adjusts the light transmittance of the transmitted light in response to a supplied voltage or a supplied current. The light transmission unit 195 may be bonded to the front or rear surface of the optical lens 10 using an optically clear adhesive. In addition, the light transmission unit 195 may be bonded to the front surface of the optical system of the display unit 190 using the optically clear adhesive.

The light transmittance of the light transmission unit 195 may be adjusted to be close to about 100% to transmit most of the light or to be close to about 0% to prevent the transmission of most of the light in response to the supply voltage (or supply current) supplied to the light transmission unit 195.

The supply voltage may be adjusted such that the light transmittance of the light transmission unit 195 may have a value in a range from 0% to 100% according to the control unit 110. According to an embodiment of the present invention, the light transmittance may have a value in a range from 5% to 95% according to the control unit 110. According to an embodiment of the present invention, the light transmittance may have a value in a range from 10% to 80% according to the control unit 110. Some of the incident light may penetrate the light transmission unit 195 and the remainder may be reflected by the light transmission unit 195 depending on the light transmittance.

The light transmission unit 195 may include an electrochromic unit, a suspended particle unit, a liquid crystal unit, a photochromic unit, or a thermochromic unit.

The electrochromic unit changes the light transmittance using a phenomenon in which a color is reversibly changed depending on a direction of an electric field according to the supply voltage input thereto. The electrochromic unit includes a material having an optical characteristic which is reversibly changed by an electrochemical oxidation-reduction reaction (which is included in, for example, an electrochromic layer). The electrochromic unit produces a chemical change of the material, i.e. an oxidation or reduction reaction to change a light transmittance (or a light reflectance) by using the supply voltage (or current).

For example, the electrochromic material may include various organic materials, inorganic materials, or a combination of an organic material and an inorganic material, such as titanium dioxide ($TiO_2$), Indium Tin Oxide (ITO), which is largely used as a transparent electrode material, an alloy of magnesium and calcium, or an alloy of magnesium and titanium.

The suspended particle unit has a structure in which a conductive film is arranged between two transparent plates (for example, ITO plates). The film contains fine dispersed and suspended particles which absorb light. When no supply voltage is input, the suspended particles absorb light and are seen as the color black. When a supply voltage is input, the suspended particles are aligned so as to transmit light. The supply voltage, which is adjusted manually or automatically, adjusts the transmittance of transmitted light rapidly and accurately.

The liquid crystal in the liquid crystal unit has both of fluidity of a liquid and a regular molecule arrangement like solid crystals. The arrangement of liquid crystal molecules is changed by the supply voltage, and when no supply voltage is input, the liquid crystal molecules are returned to the original state thereof due to an elastic restoring force. The liquid crystal unit changes the light transmittance (or light reflectance) using such an operating principle. The liquid crystal unit may additionally change the light transmittance (or light reflectance) via an alloy with a different metal. An electronic mirror (not illustrated) made of a combination of such compounds may be fabricated in various types, such as a thin film type, a film type, and a glass type.

The photochromic unit changes light transmittance using a dye, of which a color is transformed by ultraviolet rays or electrically generated ultraviolet rays (for example, D-shine photochromic dye).

The thermochromic unit changes light transmittance using a material, of which a color changes according to a temperature.

At least one element may be added to the elements illustrated in the head-mounted display device 100 of FIG. 1 or at least one of the elements illustrated in the head-mounted display device 100 may be omitted, depending on the performances of the head-mounted display device 100. In addition, it may be easily understood by a person ordinarily skilled in the art that the positions of the elements may be changed depending on the performances or the structure of the head-mounted display device 100.

Figure 3:
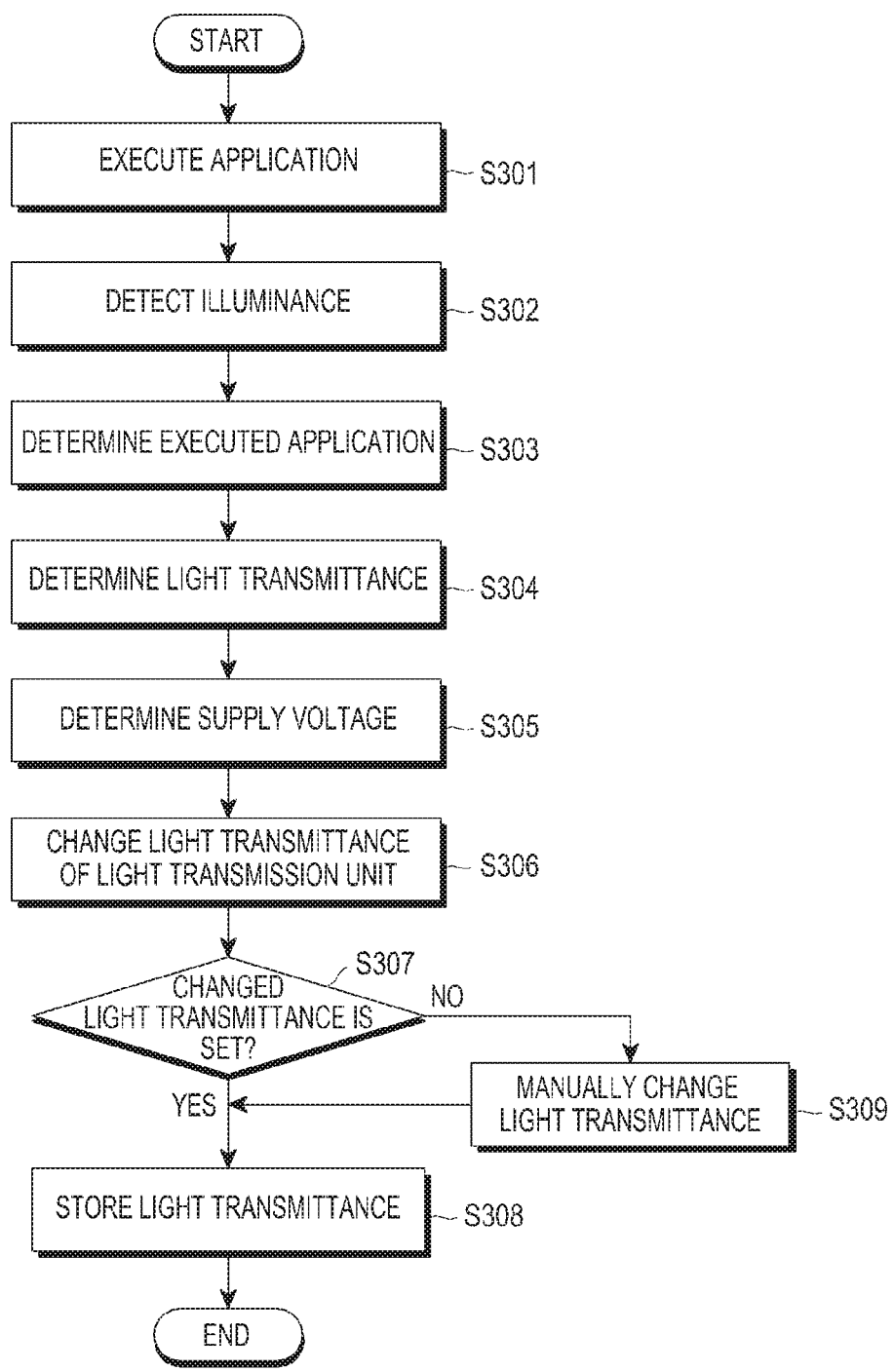
FIG. 3 is a flowchart illustrating a method of changing a light transmittance of a head-mounted display device according to an embodiment of the present invention.

FIG. 3 is a flowchart illustrating a method of changing a light transmittance of a head-mounted display device 100 according to an embodiment of the present invention.

FIGS. 4A to 4E are illustrations of a method of changing a light transmittance of a head-mounted display device 100 according to an embodiment of the present invention.

Referring to FIG. 3, an application is executed in step S301.

Figure 4A:
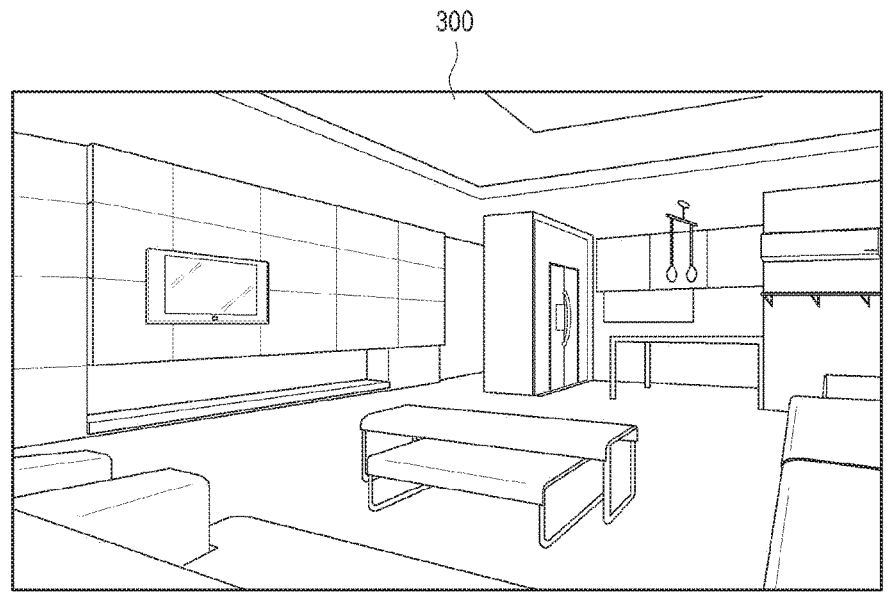
FIGS. 4A to 4E are illustrations of a method of changing a light transmittance of a head-mounted display device according to an embodiment of the present invention.

Referring to FIG. 4A, the user may see a real-world view 300 (for example, an interior) via the head-mounted display device 100. The real-world view 300 is seen via the optical lens 10 and the light transmission unit 195. The display unit 190 is not operated since no power is supplied according to the control unit 110. The light transmission unit 195 is also not operated since no power is supplied according to the control unit 110.

Figure 4B:
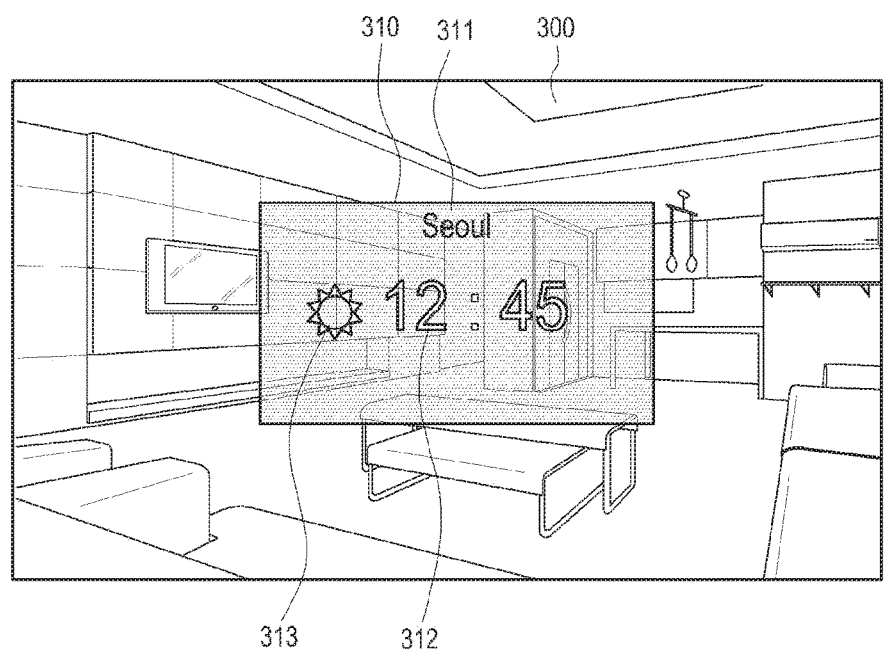

Referring to FIG. 4B, a home screen 310 is displayed on the display unit 190. The home screen 310 may display the user's position 311 (for example, Seoul), the time 312 (for example, 12:45), or the weather 313 (for example, an icon corresponding to it being sunny). The home screen 310 may display the user's position 311, the time 312, and the weather 313, selectively display a subset thereof, or none of them. The position 311, the time 312, and the weather 313 may be displayed as a text, an icon, or an image.

Upon receiving a user input for operating the display unit 190, the display device 100 is operated according to the control unit 110. The user input may be detected via the user's voice (for example, a voice received via the microphone 162), the user's motion (for example, a motion which may be detected via the sensor unit 170), the user's touch (for example, a touch received via the button 161), or the user's touch gesture (for example, a touch, flick, or swipe which may be detected via the touch pad 165).

The home screen 310 is displayed to be distinct from the real-world view 300 according to the control unit 110. For example, the control unit 110 may display the edge of the home screen 310 to be distinct from the real-world view 300 or display the brightness of the home screen 310 to be dark. Meanwhile, the light transmission unit 195 is not operated according to the control unit 110.

Figure 4C:
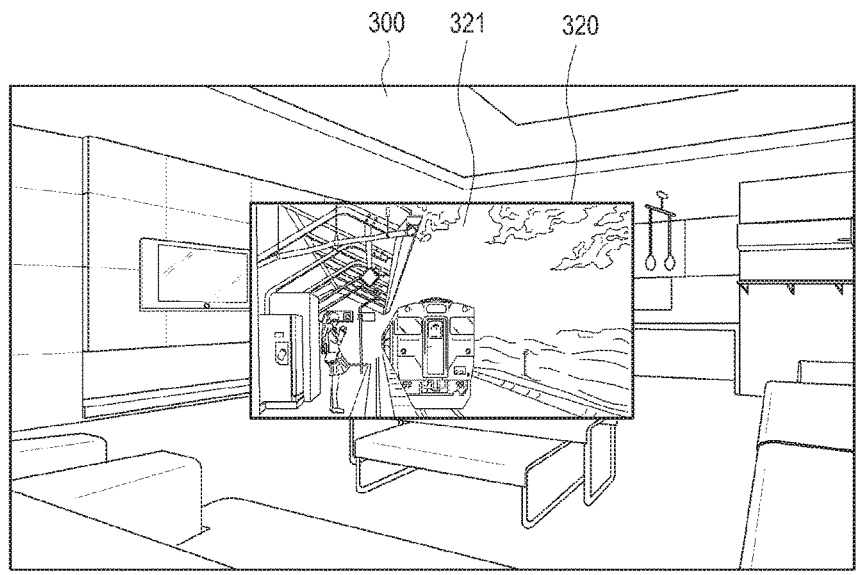

Referring to FIG. 4C, a screen of an executed application is displayed on the display unit 190.

The control unit 110 displays a screen 320 of an application corresponding to a user input (for example, a screen of a movie application) on the display unit 190. Applications executable on the head-mounted display device 100 may include, for example, a movie application, a music application, a photo application, a gallery application, a web browser application, an e-book (e-book reader) application, a game application, an augmented reality application, a Social Network Service (SNS) application, a messenger application, and an object recognition application. In addition, the contents displayed on the application executed in the head-mounted display device 100 (or a content category) may include, for example, a movie, an image, a text, a web, music, or information. According to an embodiment of the present invention, the content may mean a content category.

One application may reproduce a dedicated content or various contents. For example, the movie application may reproduce a content, such as a movie or music. When a single application is capable of reproducing various contents, the control unit 110 determines the order of priority. For example, when a movie application is determined, the control unit 110 may determine the movie as a preferentially executed content.

The control unit 110 displays a content (for example, a movie 321) in the movie application displayed on the display unit 190.

In step S302 in FIG. 3, an illuminance is detected.

When an application is executed, the control unit 110 detects the illuminance around the head-mounted display device 100 using the illuminance sensor 171. The illuminance sensor 171 outputs an illuminance signal corresponding to the detected illuminance to the control unit 110 (for example, an analog illuminance sensor may output an analog signal and a digital illuminance sensor may output a digital signal). The control unit 110 calculates the illuminance using the received illuminance signal. The control unit 110 stores the calculated illuminance in the storage unit 175 as detected illuminance information. The calculated illuminance may have a value in a range from 0 to 700 lux.

An illuminance of artificial lighting (for example, studio lighting) may be 1,000 lux, an outdoor illuminance in the daytime may be 10,000 to 25,000 lux, and an illuminance of outdoor direct sunlight may be 32,000 to 130,000 lux. An illuminance at sunrise or sunset may be 400 lux, and an luminance of a full moon adjacent to the equator may be 1 lux. The illuminance detected in FIG. 4C or in step S302 in FIG. 3, for example, is 300 lux.

The calculated illuminance may be changed to correspond to the luminance range detected by the illuminance sensor 171. In addition, the calculated illuminance may be changed in correspondence with the accuracy of the light transmittance which may be changed by the light transmission unit 195 (for example, in correspondence with the light transmittance to three decimal places).

When the application is executed, the control unit 110 detects the illuminance around the head-mounted display device 100 using the camera unit 150. The control unit 110 calculates the illuminance using luminance information of image data received via an image sensor of the camera unit 150 (for example, a Charge-coupled Device (CCD) or a Complementary Metal Oxide Semiconductor (CMOS)) and a gain. The control unit 110 stores the calculated illuminance in the storage unit 175 as photographing illuminance information. The control unit 110 determines the light transmittance of the light transmission unit 195 using the stored photographing illuminance information.

When the application is executed, the control unit 110 receives the illuminance information around the head-mounted display device 100 from an external device via the mobile communication unit 120. The control unit 110 stores the received illuminance in the storage unit 175 as received illuminance information.

The illuminance information includes at least one of the detected illuminance information, the received illuminance information, and the photographing illuminance information. For example, the illumination information may include one of the detected illuminance information, the received illuminance information, and the photographing illuminance information, or a combination of the detected illuminance information, the received illuminance information, and the photographing illuminance information.

The control unit 110 determines the light transmittance of the light transmission unit 195 using the stored illuminance information (for example, the detected illuminance information, the received illuminance information, or the photographing illuminance information). When all the detected illuminance information, the received illuminance information, and the photographing illuminance information are present in the storage unit, the control unit 110 may preferentially use the detected illuminance information. The illuminance includes illuminance information. For example, the detected illuminance may include the detected illuminance information. The received illuminance may include the received illuminance information. The photographing illuminance may include the photographing illuminance information.

The stored illuminance information may include an identification ID for history management, an illuminance value, an illuminance detection time (for example, a detection time of the illuminance sensor 171, a signal reception time via the mobile communication unit 120, or a photographing time via the camera unit 150), or present position information (for example, an outdoor position by the GPS unit 155 or an indoor position by the mobile communication unit 120).

Detected surrounding illuminances may include the detected illuminance via the illuminance sensor 171, the received illuminance via the mobile communication unit 120, and the photographing illuminance via the camera unit 150.

It may be easily understood by a person skilled in the art that when a user input is received not only in step S302 in FIG. 3 but also in step S301 in FIG. 3, a periodic time interval (for example, 30 minutes) (the time is variable), and a movement of the head-mounted display device 100 may be detected by a sensor (for example, a gyro sensor 173, a motion sensor, or a geomagnetic sensor), or when the display unit 190 is supplied with power to operate, the control unit 110 detects the surrounding illuminance.

In step S303 in FIG. 3, the executed application is determined.

Referring to FIG. 4C, the control unit 110 determines an application executed to correspond to the user input.

The control unit 110 determines the application executed using an application specification file including various information items related to a name and a configuration of the application. It may be easily understood by a person ordinarily skilled in the art that the application specification file may be changed in terms of a file name or a file extension according to an Operating System (OS) installed in the head-mounted display device 100.

In an embodiment of the present invention, it may be easily understood by a person ordinarily skilled in the art, that the term "determine" a file stored in the storage unit (for example, a manifest file), a table (for example, a light transmittance table), or information (for example, illuminance information) includes meanings of "to figure out, "to identify", "to recognize", "to read", and "to decide", and may be expressed using various terms.

When the OS is Android, the application specification file includes a manifest file (AndroidManifest.xml). The manifest file defines a name, an icon, a version, authority, a service, an execution method of a corresponding application, or category information of the contents displayed on the executed application (for example, a movie, an image, a text, a web, a music, or information). For example, in the case of Android, the control unit 110 defines the content category information, such as "Intent.category information" or "action/category information" of an "intent-filter" of the manifest file and defines the content which is being reproduced using a related Application Programming Interface (API). For example, a movie category may correspond to a video application or a camera application. An image category may correspond to a gallery application. A music category may correspond to a music application. A web category may correspond to a web browser application. A text category may correspond to an e-book application. In addition, an information (info) category may correspond to a message application or an SNS application.

In addition, the control unit 110 determines the executed application using a program manager. The program manager manages a life cycle of the application (for example, execution and ending of the application). The program manager includes an application manager.

In addition, the control unit 110 determines the executed application using an extension of a content. For example, in a case of a content, of which the extension is mpg, the control unit 110 determines the executed application as the video application. In a case of a content, of which the extension is Joint Photographic Expert Group (jpg), the control unit 110 determines the executed application as the gallery application.

It may be easily understood by a person ordinarily skilled in the art that the control unit 110 detects the surrounding illuminance even after the executed application is determined in step S303 in FIG. 3.

The light transmittance is determined in step S304 in FIG. 3.

The control unit 110 determines the light transmittance of the light transmission unit 195 using an illuminance and an application. The control unit 110 determines the light transmittance of the light transmission unit 195 using at least one of an illumination and an application stored in the storage unit 175. For example, the control unit 110 may determine the light transmittance using one of the illuminance and the application or both the illuminance and the application.

In addition, the control unit 110 determines the light transmittance of the light transmission unit 195 using at least one of an illuminance stored in the storage unit 175 or a content executed in the application. For example, the control unit 110 may determine the light transmittance using one of the illuminance and the content executed in the application or both of the illuminance and the content executed in the application.

The following Table 1 stored in the storage unit 175 illustrates examples of light transmittances determined using an illuminance and an application (or content).

TABLE 1

| Illuminance (Lux) | Content | | | | | |
|---|---|---|---|---|---|---|
| | Movie | Image | Text | Web | Music | Information (AR) |
| 700 | 10% | 10% | 10% | 10% | 70% | 70% |
| 500 | 20% | 20% | 30% | 30% | 60% | 60% |
| 300 | 50% | 50% | 60% | 60% | 50% | 50% |
| 100 | 70% | 70% | 80% | 80% | 70% | 70% |
| 50 | 80% | 80% | 80% | 90% | 90% | 90% |
| 0 | — | — | — | — | — | — |

Referring to Table 1, Content refers to contents executable in an application (or a content category), and Illuminance refers to a detected illuminance (or a received illuminance or a photographing illuminance). The control unit 110 may determine the corresponding light transmittance of the light transmission unit 195 with reference to Table 1 stored in the storage unit 175. The light transmission unit 195 may change the light transmittance in the range from 10% to 90% according to the control unit 110. In addition, the light transmission unit 195 may change the light transmittance in the range from 5% to 95%. In step S304 in FIG. 3, when the detected illuminance is 300 lux and the determined application is the movie application (or an executed content is a movie), the control unit 110 determines the light transmittance as 50% per Table 1.

It may be easily understood by a person ordinarily skilled in the art that the light transmittance of Table 1 may be changed to correspond to the performances and structure of the head-mounted display device 100.

The control unit 110 determines the light transmittance of the light transmission unit 195 using one of the illuminance, the determined application, and the content executed in the application. In such a case, the control unit 110 may use Table 1 or another dedicated table stored in the storage unit 175 separately from Table 1. The other dedicated tables stored in the storage unit 175 may include, for example, a light transmittance table corresponding to the illuminance of the light transmission unit 195, a light transmittance table of the light transmission unit 195 corresponding to the application, or a light transmittance table of the light transmission unit 195 corresponding to the content executed in the application.

When the executed application or the content displayed on the application is determined, the control unit 110 determines different light transmittances of light transmission unit 195 to correspond to detected illuminances, respectively. In addition, when illuminances are determined, the control unit 110 determines different transmittances of the light transmission unit 195 to correspond to executed applications or the contents reproduced in the applications, respectively. Even if the light transmittances of the light transmission unit 195 are the same, at least one of the contents and the illuminances may be different.

The control unit 110 stores first light transmittance information corresponding to the determined light transmittance in the storage unit 175. The first light transmittance information may include, for example, an identification ID for history management, a determined light transmittance, a luminance corresponding to the light transmittance, a determined application, or a content type executed in the application.

In step S305 in FIG. 3, a supply voltage is determined.

The control unit 110 determines the supply voltage to be supplied to the light transmission unit 195 from the power supply unit 180 using Table 2 stored in the storage unit 175 to correspond to the determined light transmittance.

The following Table 2 represents examples of supply voltages corresponding to light transmittances determined according to an illuminance and an application.

TABLE 2

| Light Transmittance (%) | Voltage (V) |
|---|---|
| 100 | −1.85 |
| 90 | −1.8 |
| 80 | −1.5 |
| 70 | −1.0 |
| 60 | −0.7 |
| 50 | −0.55 |
| 40 | −0.30 |
| 30 | −0.05 |
| 20 | 0.3 |

TABLE 2-continued

| Light Transmittance (%) | Voltage (V) |
|---|---|
| 10 | 0.45 |
| 0 | 0.6 |

Referring to Table 2, the supply voltage may be linearly changed from −1.85V to 0.6V depending on the light transmittance in percent (%), where the first column corresponds to the second column and the third column corresponds to the fourth column. In step S305 in FIG. 3, the control unit 110 may determine a supply voltage corresponding to the light transmittance of 50% as −0.55V.

The control unit 110 determines the supply voltage using interpolation for a light transmittance which is not indicated in Table 2. The supply voltages of Table 2 are those in a state where a residual capacity of the power supply unit 180 or a battery of the head-mounted display device 100 is normal. When the residual capacity of the battery of the head-mounted display device 100 is insufficient (for example, in a low-battery state), the control unit 110 determines a supply voltage which is different from that in Table 2 to correspond to the determined light transmittance.

The control unit 110 stores supply voltage information corresponding to the determined supply voltage in the storage unit 175. The supply voltage information may include, for example, an identification ID for history management, a determined supply voltage, a light transmittance corresponding to the supply voltage, an illuminance, a determined application, or a content executed in the application.

It may be easily understood by a person ordinarily skilled in the art that the supply voltages in Table 2 may be changed to correspond to the performances and structure of the head-mounted display device 100. In addition, it may be easily understood by a person ordinarily skilled in the art that the supply voltages in Table 2 may be converted to supply currents.

In step S306 in FIG. 3, the light transmittance of the light transmission unit is changed.

Figure 4D:
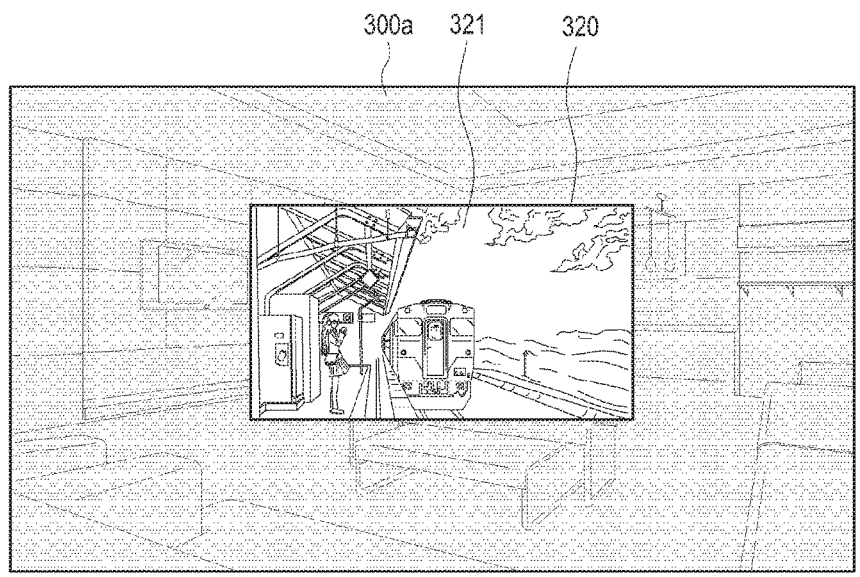

Referring to FIG. 4D, the control unit 110 changes the light transmittance of the light transmission unit 195. The control unit 110 changes the supply voltage to correspond to the determined light transmittance supplied to the light transmission unit 195. The real-world view 300 of FIG. 4C is changed to another rear-world view 300a in FIG. 4D to correspond to the changed light transmittance (for example, 50%) of the light transmission unit 195. The user may watch both of the another real-world view 300a and the movie 321 displayed on the display unit 190. The user is provided with improved visibility of the movie 321 displayed on the display unit 190 because of the another real-world view 300a. Further, the user may become more absorbed in the displayed movie 321 because of the another real-world view 300a.

The control unit 110 provides various feedback in response to a change of the light transmittance of the light transmission unit 195. The feedback may be provided as one of, for example, a visual feedback or an auditory feedback. In addition, the control unit 110 may provide both the visual feedback and the auditory feedback in response to a change of the light transmittance. In addition, if the head-mounted display device 100 includes a vibration motor, the control unit 110 provides a tactile feedback to the user using the vibration motor.

With the visual feedback, a visual effect in response to a change of the light transmittance of the light transmission unit 195 (for example, an effect of changing the light transmittance to be visually different from the current light transmittance according to the determined light transmittance) is provided by the light transmission unit 195. In addition to the visual feedback, another visual effect (for example, an animation effect such as a separate image or fading applied to the non-illustrated separate image) may be provided by the display unit 190. Further, in addition to the visual feedback, the above-described visual effects in response to a change of the light transmittance of the light transmission unit 195 may be provided by both the light transmission unit 195 and the display unit 190.

The auditory feedback may output a sound in response to a change of the light transmittance of the light transmission unit 195 through the speaker 163.

At least one feedback may be maintained from the start of a change of the light transmittance of the light transmission unit 195 to the completion of a change of the light transmittance. A feedback corresponding to a change of the light transmittance of the light transmission unit 195 (for example, at least one of the visual feedback and the auditory feedback) may be selected and/or changed through the configuration of the OS. The control unit 110 sets and/or changes a length of time in which at least one feedback corresponding to a change of the light transmittance of the light transmission unit 195 is provided to the user (for example, 500 msec) by a user input.

In step S307 in FIG. 3, the changed light transmittance is set.

Figure 4E:
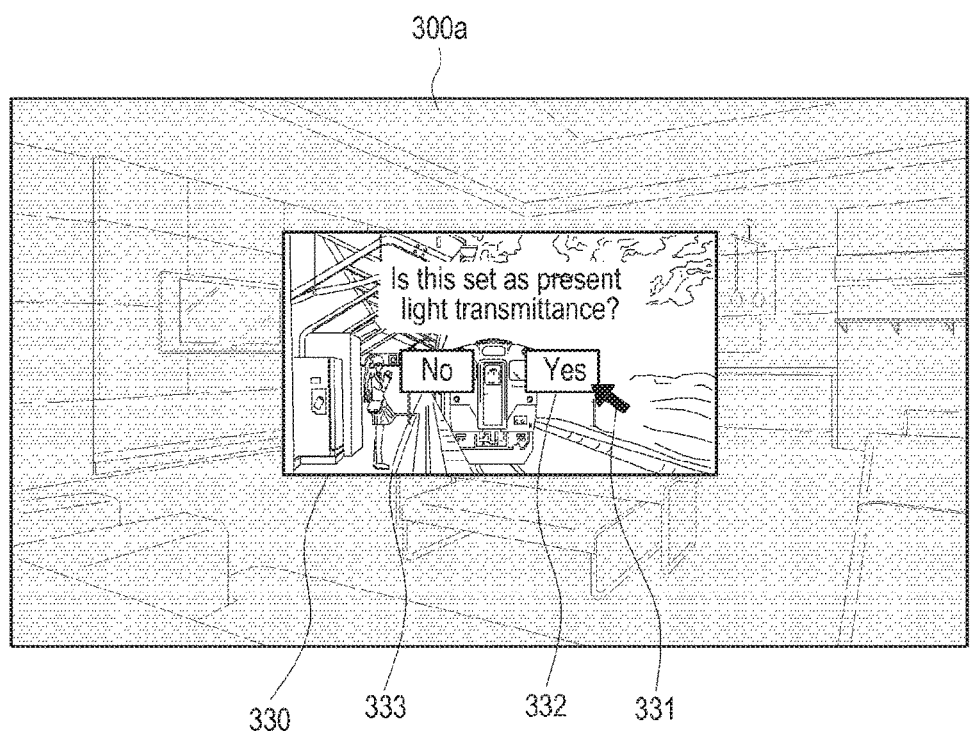

Referring to FIG. 4E, the control unit 110 displays a popup 330 and/or a pointer 331 for setting a changed light transmittance on the display unit 190. The popup 330 and/or the pointer 331 is displayed on the reproduced movie 321 to be distinctive from the movie 321. The pointer 331 may be positioned at "Yes" 332 as a default value. "Yes" 332 or "No" 331 may be input by a user input. When "Yes" 332 is selected by the user input, the control unit 110 sets the changed light transmittance.

In step S308 in FIG. 3, the changed light transmittance is stored.

The control unit 110 stores a second light transmittance information corresponding to the set light transmittance in the storage unit 175. The second light transmittance information may include an indication ID for history management, the set light transmittance, a luminance corresponding to the light transmittance, a determined application, or a content executed in the application. When the light transmittance set in step S307 in FIG. 3 is equal to the light transmittance determined in step S304 in FIG. 3, the first light transmittance information is equal to the second light transmittance information.

When a changed light transmittance is stored in step S308 in FIG. 3, the method of changing the light transmittance of the head-mounted display device 100 ends.

According to another embodiment of the present invention, the method of changing the light transmittance of the head-mounted display device 100 may be ended when the light transmittance changed in step S308 in FIG. 3 is directly stored, skipping step S307 in FIG. 3 without setting the light transmittance changed by the user input in step S307 in FIG. 3.

Returning to step S307 in FIG. 3, when a changed light transmittance is not set, the process proceeds to step S309 in FIG. 3.

In step S309 in FIG. 3, the light transmittance is changed manually.

Referring to FIG. 4E, when "No" 333 is selected by the user input, the control unit 110 allows the light transmittance determined in step S304 in FIG. 3 to be manually changed by user input. The user input which may manually change the light transmittance may include the user's voice (for example, a voice received through the microphone 162), the user's motion (for example, a motion detected through the sensor unit 170), the user's touch (for example, a touch received through the button 161), or the user's touch gesture (for example, a touch, flick or swipe detected through the touch pad 165).

The control unit 110 changes the light transmittance of the light transmission unit 195 (for example, an automatically determined light transmittance) separately from the movie displayed on the display unit 190, in response to a user input. The present light transmittance (for example, 50%) may be increased (for example, to 51% or more) or decreased (for example, to 49% or less) by the control unit 110 based on the user input. When the light transmittance is determined based on a user input, the control unit 110 determines the supply voltage corresponding to the manually determined light transmittance using Table 2. The power supply unit 180 supplies the supply voltage corresponding to the manually determined light transmittance to the light transmission unit 195 according to the control unit 110.

When the light transmittance is manually changed in step S309 in FIG. 3, the process proceeds to step S308 in FIG. 3.

In step S308 in FIG. 3, the changed light transmittance is stored.

The control unit 110 may store a third light transmittance information corresponding to the manually set light transmittance in the storage unit 175. The third light transmittance information may include an identification ID for history management, the set light transmittance, a luminance corresponding to the light transmittance, a determined application, or a content executed in the application.

When the manually changed light transmittance is stored in step S308 in FIG. 3, the method of changing the light transmittance of the head-mounted display device 100 ends.

Figure 5A:
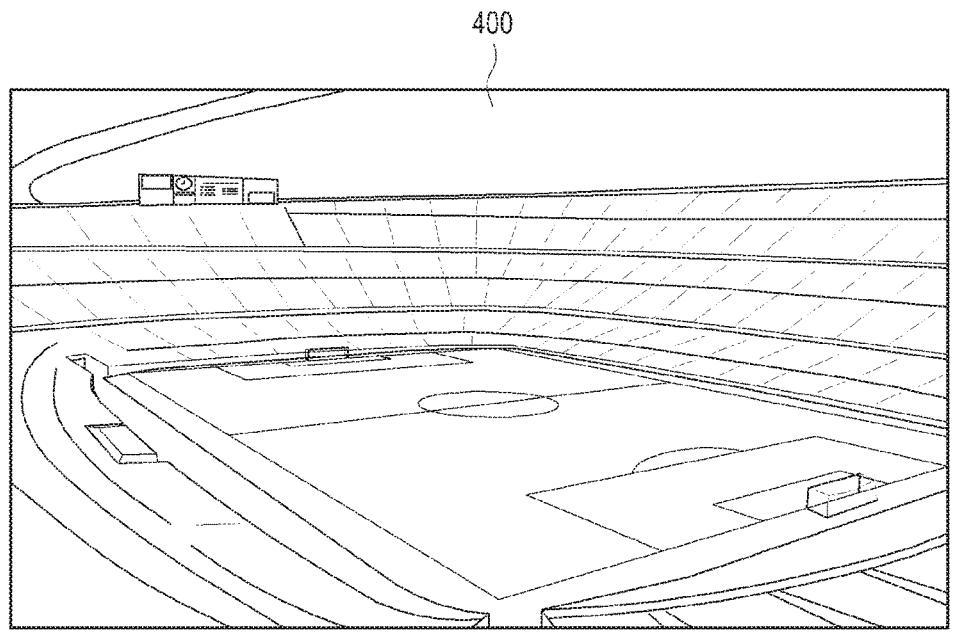
FIGS. 5A and 5B are illustrations of a method of changing a light transmittance of a head-mounted display device according to an embodiment of the present invention.
Figure 5B:
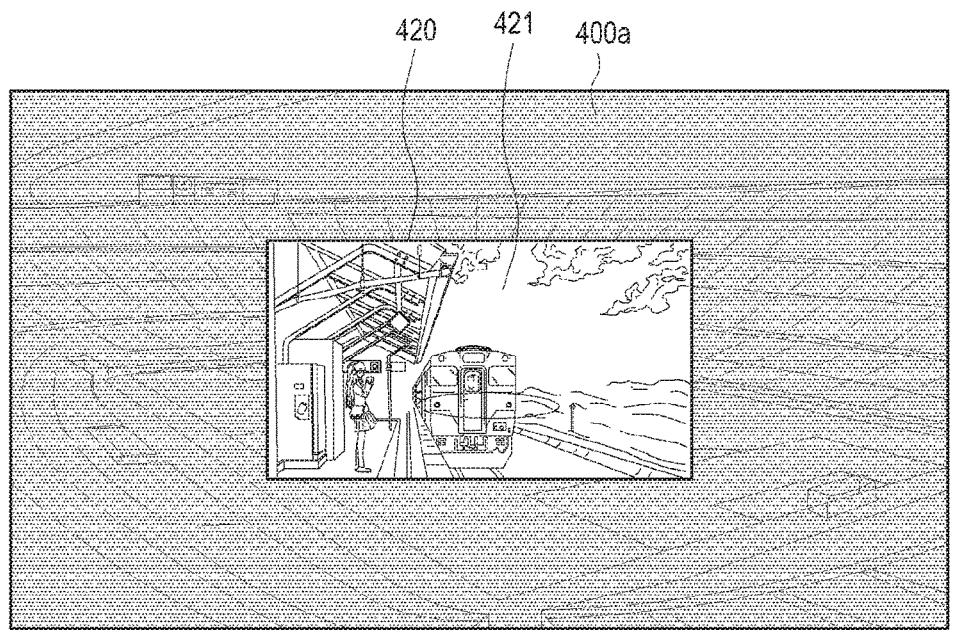

FIGS. 5A and 5B are illustrations of a method of changing a light transmittance of the head-mounted display device, according to an embodiment of the present invention.

FIGS. 5A and 5B illustrates a case in which detected illuminances are different from each other and determined applications are equal to each other, unlike FIGS. 4A to 4E.

Referring to 5A, the user may watch a real-world view 400 (for example, an outdoor sports stadium) through the head-mounted display device 100. When the display unit 190 is operated, the control unit 110 detects an illuminance. Since it is outdoor and daylight, the detected illuminance may be 700 lux.

The control unit 110 determines an executed application 420 as a movie application (or a content executed as movie 421). The control unit 110 may determine the light transmittance corresponding to the detected illuminance and the determined application (or the movie as the content executed therein) to be 10% using Table 1. In addition, the control unit determines the supply voltage corresponding to the determined light transmittance of 10% to be 0.45 volts using Table 2.

Referring to FIG. 5B, the control unit 110 changes the light transmittance of the light transmission unit 195. The power supply unit 180 supplies the determined supply voltage of 0.45 volts to the light transmission unit 195 according to the control unit 110. The real-world view 400 of FIG. 5A is changed to another real-world view 400a in FIG. 5B to correspond to the changed light transmittance (for example, 10%) of the light transmission unit 195. The user may watch both the another real-world view 400a and the movie 421 displayed on the display unit 190. The user is provided with improved visibility of the movie 421 displayed on the display unit 190 because of the another real-world view 400a. In addition, the user may become more adsorbed in the displayed movie due to the another real-world view 400a.

Figure 6A:
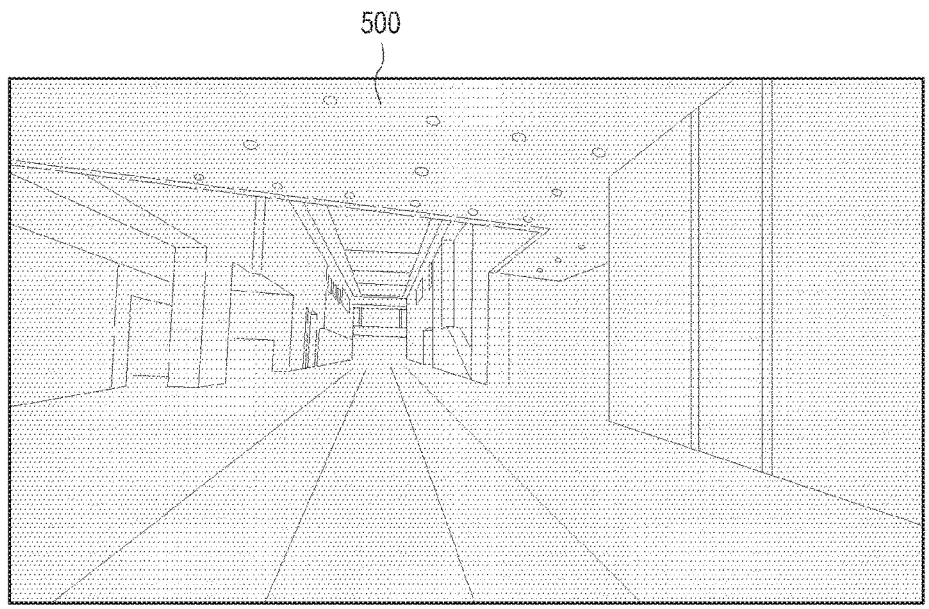
FIGS. 6A and 6B are illustrations of a method of changing a light transmittance of a head-mounted display device according to an embodiment of the present invention.
Figure 6B:
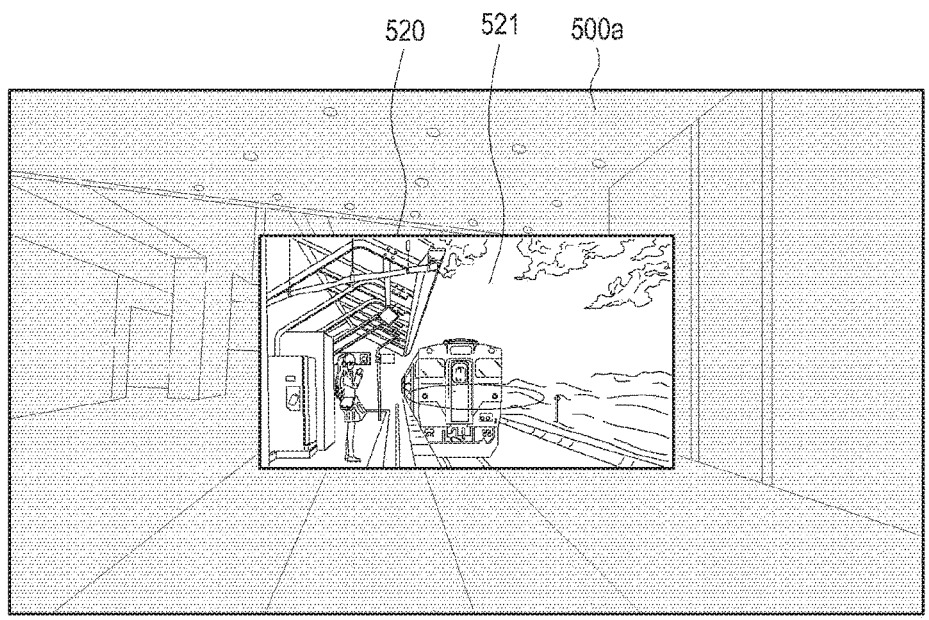

FIGS. 6A and 6B are illustrations of a method of changing the light transmittance of the head-mounted display device 100, according to an embodiment of the present invention.

FIGS. 6A and 6B illustrate a case in which detected illuminances are different from each other and determined applications are equal to each other, unlike FIGS. 4A to 4E.

Referring to FIG. 6A, the user may watch a real-world view 500 (for example, an indoor dark hallway) through the head-mounted display device 100. When the display unit 190 is operated, the control unit 110 detects an illuminance. Since it is indoor and dark, the detected illuminance may be 100 lux.

The control unit 110 determines an executed application 520 as a movie application (or a content executed therein as a movie 521). The control unit 110 may determine the light transmittance corresponding to the detected illuminance and the determined application (or the movie as the content executed therein) as 70% using Table 1. In addition, the control unit 110 determines the supply voltage corresponding to the determined light transmittance of 70% as −1.0 volts using Table 2.

Referring to FIG. 6B, the control unit 110 changes the light transmittance of the light transmission unit 195. The power supply unit 180 supplies the determined supply voltage of −1.0 volts to the light transmission unit 195 according to the control unit 110. The real-world view 500 is changed to another real-world view 500a to correspond to the changed light transmittance (for example, 70%) of the light transmission unit 195. The user may watch both the another real-world view 500a and the movie 521 displayed on the display unit 190. The user is provided with improved visibility of the movie 521 displayed on the display unit 190 because of the another real-world view 500a. Further, the user may become more absorbed in the displayed movie because of the another real-world view 500a.

Figure 7A:
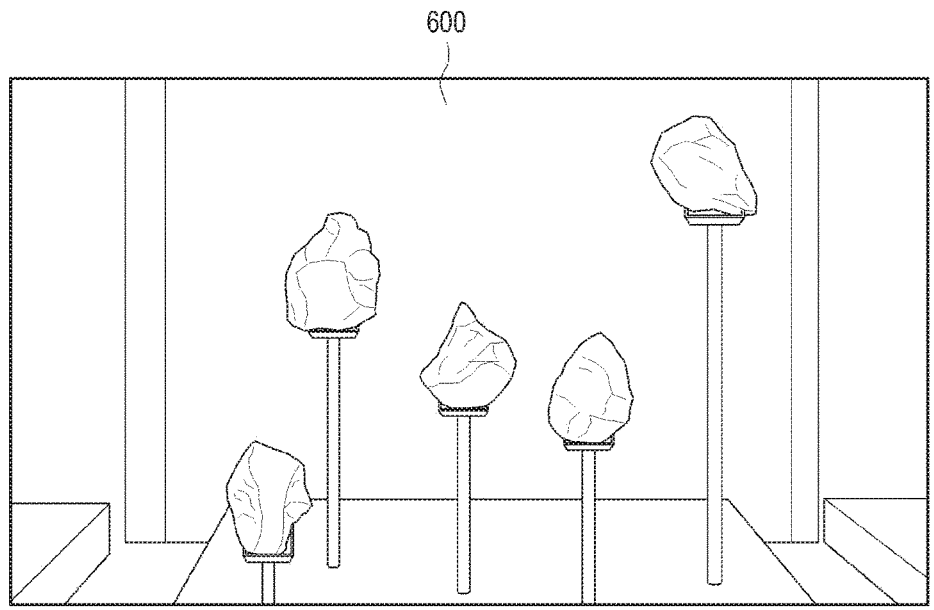
FIGS. 7A and 7B are illustrations of a method of changing a light transmittance of a head-mounted display device according to an embodiment of the present invention.
Figure 7B:
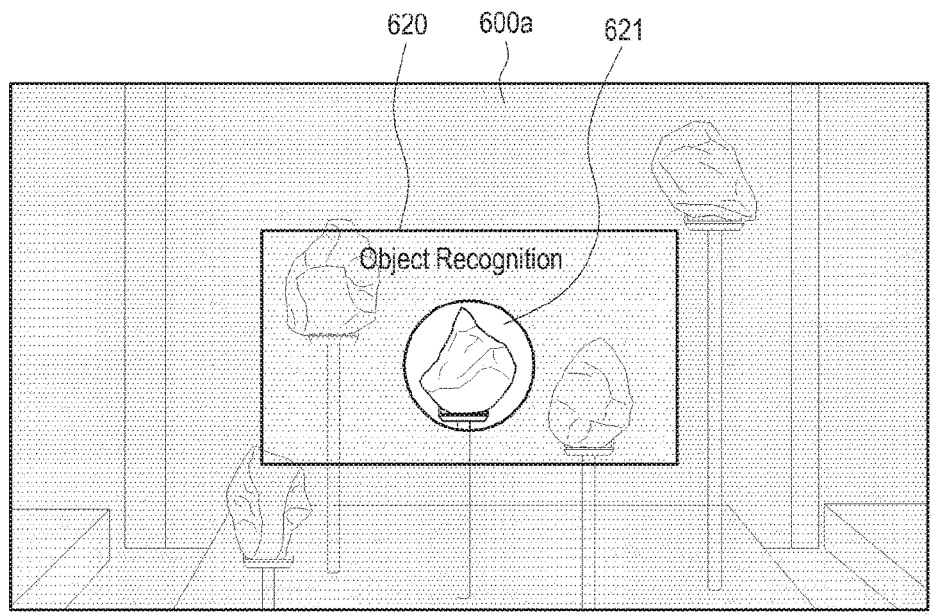

FIGS. 7A and 7B are illustrations of a method of changing the light transmittance of the head-mounted display device 100, according to an embodiment of the present invention.

FIGS. 7A and 7B illustrate a case in which detected illuminances are equal to each other and determined applications are different from each other, unlike FIGS. 4A to 4E.

Referring to FIG. 7A, the user may watch a real-world view 600 (for example, indoor relics) through the head-mounted display device 100. When the display unit 190 is operated, the control unit 110 detects an illuminance. Since it is indoor and bright, the detected illuminance may be 300 lux.

The control unit 110 may determine an executed application 620 as an object recognition application (or a content executed therein as information 621). The control unit 110 may determine the light transmittance corresponding to the detected illuminance and the determined application (or the information as the content executed therein) as 50% using Table 1. In addition, the control unit 110 determines the supply voltage corresponding to the determined light transmittance of 50% as −0.55 volts using Table 2.

Referring to FIG. 7B, the control unit 110 changes the light transmittance of the light transmission unit 195. The power supply unit 180 supplies the determined supply voltage of −0.55 volts to the light transmission unit 195 according to the control unit 110. The real-world view 600 is changed to another real-world view 600a to correspond to the changed light transmittance (for example, 50%) of the light transmission unit 195. The user may watch both the another real-world view 600a and the information displayed on the display unit 190. The user is provided with improved visibility of the information displayed on the display unit 190 because of the another real-world view 600a.

Figure 8A:
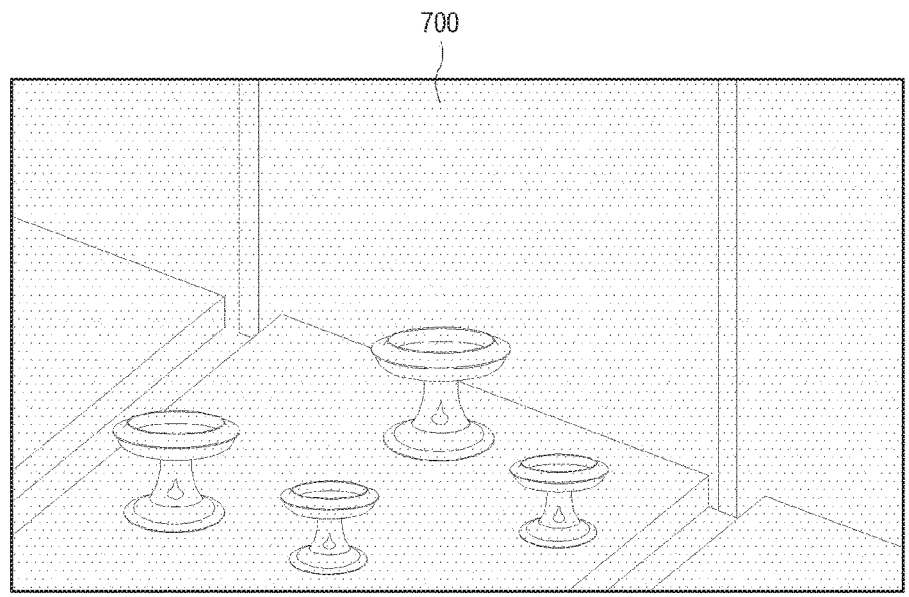
FIGS. 8A and 8B are illustrations of a method of changing a light transmittance of a head-mounted display device, according to an embodiment of the present invention.
Figure 8B:
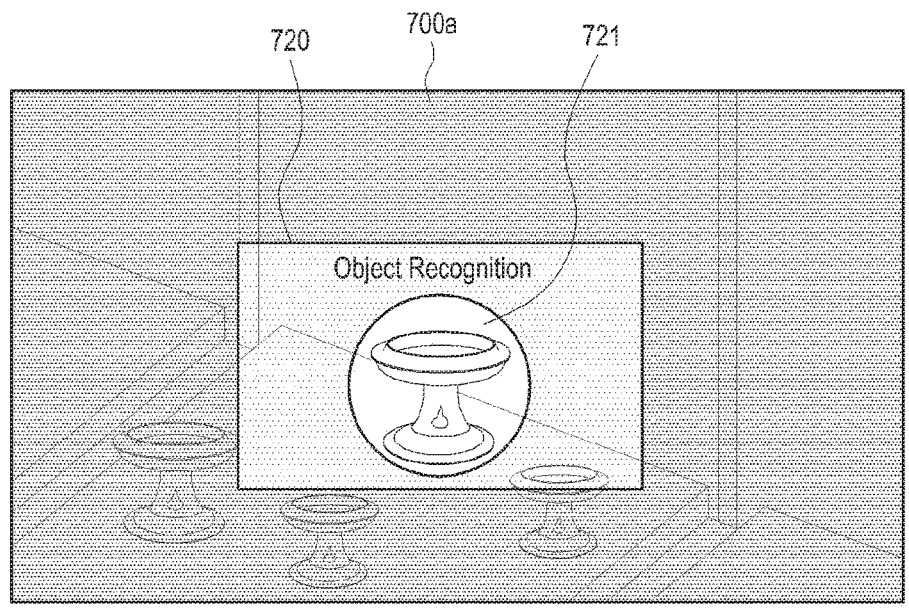

FIGS. 8A and 8B are illustrations of a method of changing the light transmittance of the head-mounted display device 100, according to an embodiment of the present invention.

FIGS. 8A and 8B illustrate a case in which detected illuminances are different from each other and determined applications are also different from each other, unlike FIGS. 4A to 4E.

Referring to FIG. 8A, the user may watch a real-world view 700 (for example, indoor relics) through the head-mounted display device 100. When the display unit 190 is operated, the control unit 110 detects an illuminance. Since it is indoor and darker than FIG. 7A, and the distance between the user and the relics are longer than that in FIG. 7A, the detected illuminance may be 100 lux.

The control unit 110 may determine an executed application 720 as an object recognition application (or a content executed therein as information 721). The control unit 110 may determine the light transmittance corresponding to the detected illuminance and the determined application (or the information as the content executed therein) as 70% using Table 1. In addition, the control unit 110 determines the supply voltage corresponding to the determined light transmittance of 70% as −1.0 volts using Table 2.

Referring to FIG. 8B, the control unit 110 changes the light transmittance of the light transmission unit 195. The power supply unit 180 supplies the determined supply voltage of −1.0 volts to the light transmission unit 195 according to the control unit 110. The real-world view 700 is changed to another real-world view 700a to correspond to the changed light transmittance (for example, 70%) of the light transmission unit 195. The user may watch both the another real-world view 700a and the information displayed on the display unit 190. The user is provided with improved visibility of the information displayed on the display unit 190 because of the another real-world view 700a.

The methods according to embodiments of the present invention may be implemented in a form of program commands executed through various computer means to be recorded in a non-transitory computer-readable medium. The non-transitory computer-readable medium may include a program command, a data file, and a data structure individually or a combination thereof. Software may be stored, for example, in a volatile or non-volatile storage device such as a ROM, a memory such as a RAM, a memory chip, a memory device, or a memory IC, or a storage medium that is optically or magnetically recordable and simultaneously machine (for example, a computer) readable, such as a Compact Disc (CD), a Digital Video Disc (DVD), a magnetic disk, or a magnetic tape, regardless of its ability to be erased or re-recorded. It can be seen that a memory which may be included in the head-mounted display device corresponds to an example of the storage medium suitable for storing a program or programs including instructions by which the embodiments of the present invention are realized. The program command recorded in the medium is specially designed and configured for the present invention, but may be used after being known to those skilled in computer software fields.

Although the present invention has been described by the embodiments and the drawings as described above, the present invention is not limited to the aforementioned embodiments and various modifications and alterations can be made from the descriptions by those skilled in the art to which the present invention pertains.

Accordingly, the scope of the present invention should not be determined by the above-described embodiments, but should be determined by not only the following claims but also their equivalents.

What is claimed is:

1. A method of changing a light transmittance of a head-mounted display device including a display and an optical lens, the method comprising:
   obtaining, by a sensor, a first illuminance around the head-mounted display device;
   determining a first light transmittance based on the first illuminance and a type of a content to display on the display;
   changing, by a processor, a light transmittance of the optical lens to the first light transmittance; and
   wherein when the first illuminance is greater than a second illuminance, the first light transmittance corresponding to the first illuminance is less than a second light transmittance corresponding to the second illuminance.

2. The method of claim 1, further comprising:
   determining a supply voltage corresponding to the first light transmittance,
   wherein the supply voltage is supplied to a light transmission unit included in the head-mounted display device.

3. The method of claim 1, wherein the first illuminance is at least one of a third illuminance detected through the sensor and a fourth illuminance received by an external device.

4. The method of claim 1, wherein determining the first light transmittance includes determining the first light transmittance further based on information of an application.

5. The method of claim 1, wherein determining the first light transmittance includes determining the first light transmittance further based on at least one of a program manager that manages a life cycle of the application, and an application specification file that includes information of the application.

6. The method of claim 5, wherein the program manager includes an activity manager or a package manager.

7. The method of claim 1, wherein the first light transmittance is changeable by a user input.

8. The method of claim 1, further comprising changing a visibility of the content included in the application to a first visibility corresponding to the first light transmittance.

9. The method of claim 1, wherein the first light transmittance is changeable in a range from 5% to 95%.

10. The method of claim 2, wherein the light transmission unit includes one of an electrochromic unit, a suspended particle unit, a liquid crystal unit, a photochromic unit, and a thermochromic unit.

11. The method of claim 1, further comprising providing at least one of a visual feedback and an auditory feedback to indicate the changing of the light transmittance of the optical lens.

12. A head-mounted display device, comprising:
a sensor;
a display;
a light transmission unit configured to adjust a light transmittance of an optical lens included in the head-mounted display device; and
a controller configured to:
obtain, using the sensor, a first illuminance around the head-mounted display device,
determine a first transmittance based on the first illuminance and a type of the content to display on the display, and
change the light transmittance of the optical lens to the first light transmittance,
wherein when the first illuminance is greater than a second illuminance, the first light transmittance corresponding to the first illuminance is less than a second light transmittance corresponding to the second illuminance.

13. The head-mounted display device of claim 12, wherein the first illuminance is at least one of a third illuminance detected through the sensor and a fourth illuminance received by an external device.

14. The head-mounted display device of claim 12, wherein the controller is further configured to supply a supply voltage corresponding to the light transmittance from a power supply to the light transmission unit.

15. The head-mounted display device of claim 12, wherein the light transmission unit includes one of an electrochromic unit, a suspended particle unit, a liquid crystal unit, a photochromic unit, and a thermochromic unit.

16. The head-mounted display device of claim 12, wherein the light transmission unit includes an electrochromic unit,
wherein the electrochromic unit includes:
a first Indium Tin Oxide (ITO) layer; an electrochromic layer on the first ITO layer, wherein a light transmittance of the electrochromic layer is changeable via a supply voltage; an electrolyte layer on the electrochromic layer; a second ITO layer on the electrolyte layer; and a plurality of electrodes connected with the first ITO layer and the second ITO layer, respectively, wherein the supply voltage is input to the plurality of electrodes.

17. The head-mounted display device of claim 12, wherein the light transmission unit is bonded to one of a front surface and a rear surface of the optical lens.

18. The head-mounted display device of claim 12, wherein a screen of the content displayed on the display is smaller than the optical lens.

\* \* \* \* \*